J. L. MORRIS.
AUTOMATIC WEIGHING APPARATUS.
APPLICATION FILED MAR. 29, 1917.

1,253,081.

Patented Jan. 8, 1918.
2 SHEETS—SHEET 1.

Witnesses:
C. K. Reichenbach.
A. R. Fowler.

Inventor
J. L. Morris.
By Fransch & Hoyt
Attorney

J. L. MORRIS.
AUTOMATIC WEIGHING APPARATUS.
APPLICATION FILED MAR. 29, 1917.
1,253,081.
Patented Jan. 8, 1918.
2 SHEETS—SHEET 2.
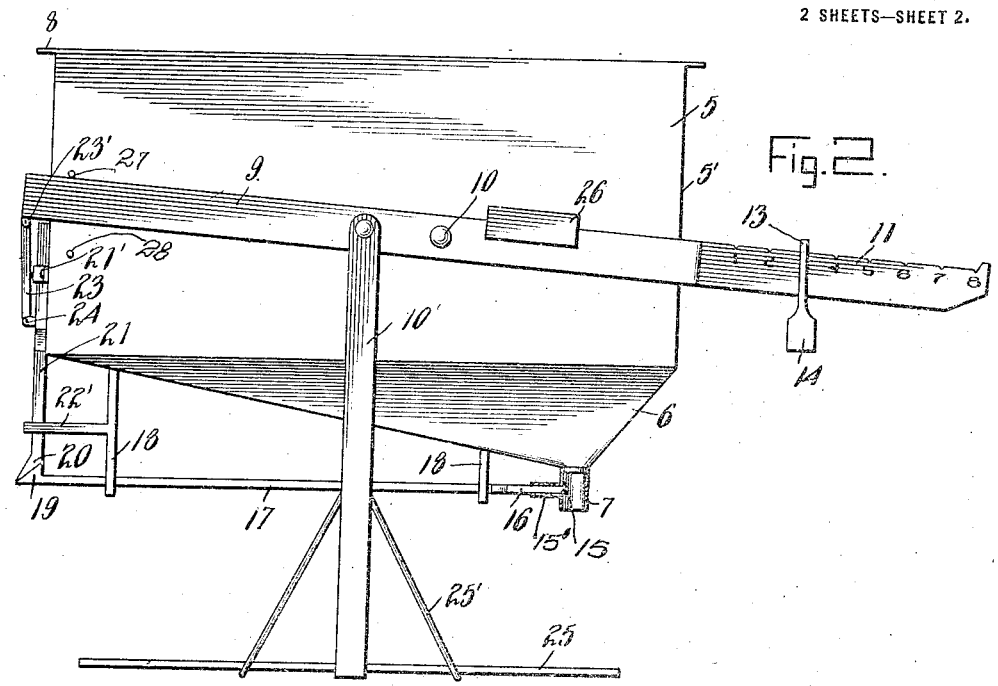
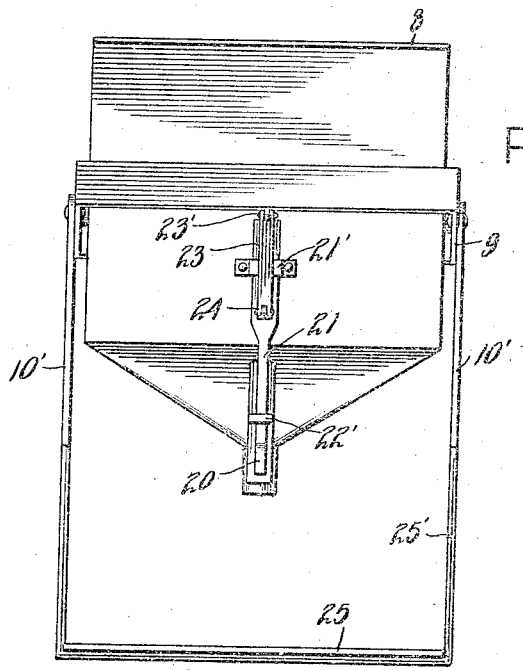

UNITED STATES PATENT OFFICE.

JOLLY L. MORRIS, OF CRAFTON, PENNSYLVANIA.

AUTOMATIC WEIGHING APPARATUS.

1,253,081. Specification of Letters Patent. Patented Jan. 8, 1918.

Application filed March 29, 1917. Serial No. 158,318.

*To all whom it may concern:*

Be it known that I, JOLLY L. MORRIS, a citizen of the United States, residing at Crafton, in the county of Allegheny and State of Pennsylvania, have invented certain new and useful Improvements in Automatic Weighing Apparatus; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in weighing devices and has particular reference to such devices especially adapted for weighing dry materials.

The primary object of the invention is the provision of a weighing device of this character which will automatically cut off the discharge of material to the scale when a predetermined amount of material has been deposited.

A further object of the invention is to provide a combined weighing scale and bin, the scale being supported by the bin in such a manner that the platform thereof is directly under the discharge spout of the bin.

My invention is illustrated in the accompanying drawings, in which:—

Fig. 2 is a side elevation.

Fig. 3 is an end elevation.

Figure 1:
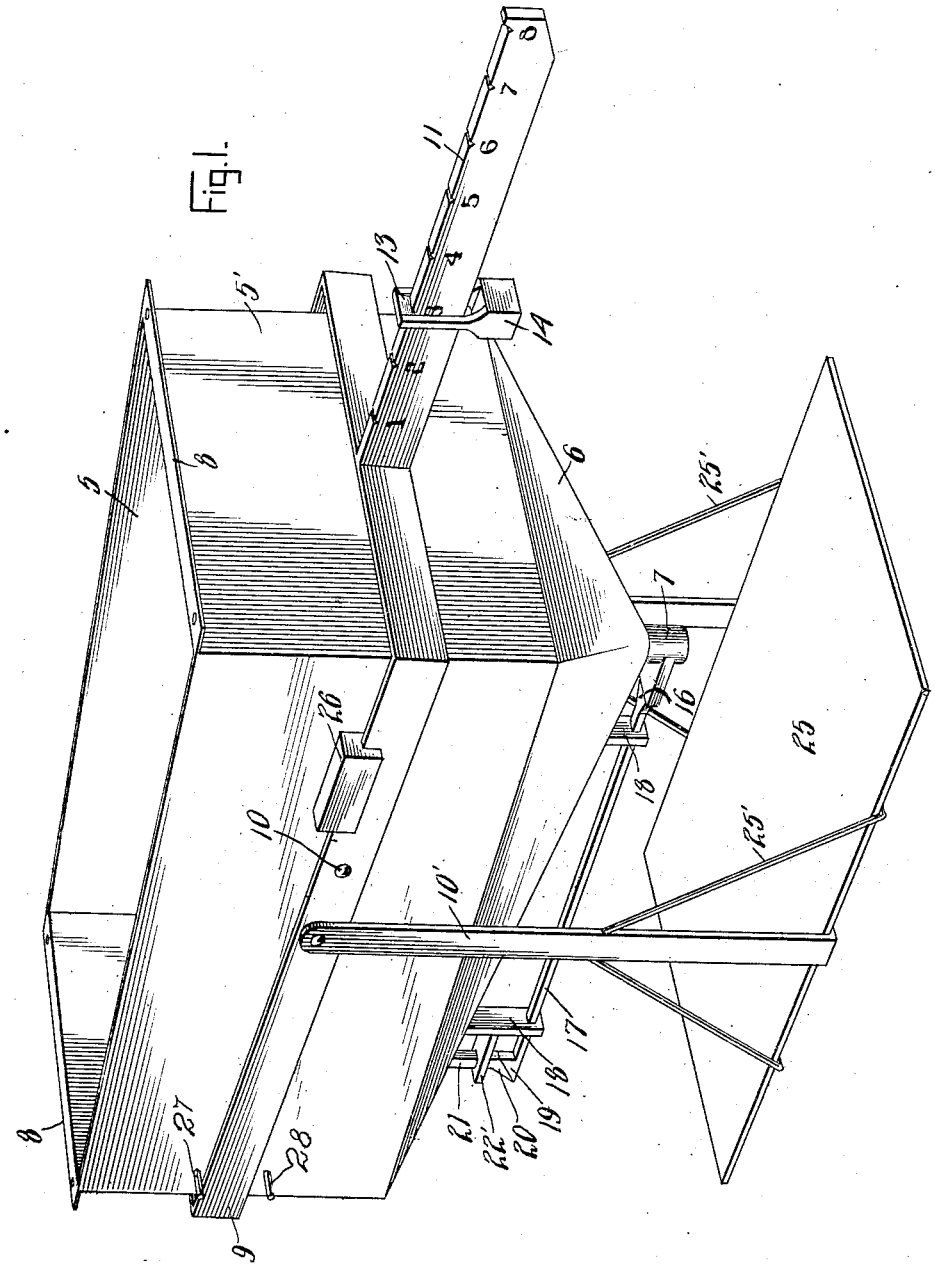
Figure 1 is a perspective view of a combined bin and weighing scale.

Reference now being had to the details of the drawings by numeral, 5 indicates a bin having a hopper bottom 6, inclined to an outlet spout 7. The upper edge of the walls 5' of the bin are flanged as at 8 and are provided with openings to receive suitable securing means, for securing the bin to a box, barrel or any suitable supporting means, when the device is to be used in connection with a barrel or other supply receptacle.

A scale supporting yoke 9 extends entirely around the bin 5 and is pivotally connected thereto by means of the pivot pin 10, said pivot pin 10 being disposed at a point to the right of the center of the yoke 9 to permit the upper ends of the standards 10' to be supported centrally thereof.

Arranged centrally of one end of the yoke 9 is a graduated beam 11 having notches 12 provided in the upper edge thereof, to receive the knifelike edge 13 of the poise 14, operating along said beam 11 to balance the material being weighed.

The discharge spout 7 has a slot 15 provided in one side thereof, the slot 15 communicating with a guide 15' and through this slot and guide operates a slidable cutoff valve 16, having an integral arm 17 spaced from the bottom of the hopper 6, and operating through guides 18 depending from the under side thereof. A cam 19 is formed on the outer edge of the arm 17 and coöperates with a cam 20 formed on the lower end of the vertically operating rod 21 which operates in guides 21' and 22', and it will be seen that movement of the rod 21 produces a relative movement of the rod 17 to cut off the supply of material through discharge spout 7.

Movement of the yoke 9 is transmitted to the rod 21 by means of the rod 23 which has one of its ends pivotally connected to the yoke 9 by pivot pin 23', the opposite end being connected to the rod 21 by means of the pivot pin 24.

The lower ends of the standards 10' support the platform 25 which is held thereon by the brace rods 25' extending angularly therefrom. It might be further stated that a weight 26 is adjustable along the yoke 9 to balance the weight of the platform 25 for holding the yoke normally evenly balanced. Pins 27 and 28 are positioned on the bin and in spaced relation, the yoke operating therebetween, and it is obvious that the yoke engages the pins 27 and 28 when the same is oscillated, thereby restricting the movement of the yoke 9.

The operation of the device is as follows:—The poise 14 having been placed in its desired position along the beam 11, a bag or other receptacle is positioned on the platform 25 and, when the weight 14 is overbalanced by the weight of the material on the platform, the rod 23 causes the cams 19 and 20 to coöperate to move the rod 17, thereby moving the cutoff valve 16 with the result that the discharge of material through the discharge spout 7 is cut off.

What I claim to be new is:—

1. In combination with a bin having a discharge opening, a weighing scale including a yoke extending around the bin and pivotally connected thereto, a platform pivotally connected to the yoke, a cutoff valve operating in the discharge spout, a horizontally operating rod connected to the cut-off valve, a vertically operating rod connected to one end of the bin and having connection with the yoke, and means on one end of each of the rods for coöperating, whereby movement of one rod will produce a relative movement of the other rod.

2. In combination with a bin having a discharge opening, a weighing scale including a yoke extending around the bin and having a graduated extension, a weight on the extension, a platform, standards connecting the platform and yoke, a vertically operating rod connected with the yoke and having a cam surface on one end thereof, a horizontally operating rod having a cam surface on one end thereof adapted to coöperate with the cam surface of the first mentioned rod, the opposite end of the horizontally operating rod having an integral valve member operating in the discharge spout for cutting off the discharge of material through the spout, and a weight on the yoke for balancing the platform.

In testimony whereof I hereunto affix my signature in the presence of two witnesses.

JOLLY L. MORRIS.

Witnesses:
J. J. BAKEWELL,
ERNEST PAYNE.

Copies of this patent may be obtained for five cents each, by addressing the "Commissioner of Patents, Washington, D. C."